United States Patent [19]

Becker

[11] 4,292,109
[45] Sep. 29, 1981

[54] METHOD OF MAKING LASER DISC MEMORY STORAGE ARTICLE

[76] Inventor: Carl H. Becker, 521 Del Medio Ave., Apt. 116, Mountain View, Calif. 94040

[21] Appl. No.: 75,707

[22] Filed: Sep. 14, 1979

Related U.S. Application Data

[63] Continuation-in-part of Ser. No. 931,515, Aug. 7, 1978, abandoned.

[51] Int. Cl.³ .................. C03C 17/09; B32B 15/08; G01D 15/34
[52] U.S. Cl. .................. 156/281; 156/285; 427/164; 427/166
[58] Field of Search .......... 427/164, 166; 156/281, 156/285

[56] References Cited

U.S. PATENT DOCUMENTS

| 3,314,073 | 4/1967 | Becker | 346/76 L |
| 3,474,457 | 10/1969 | Becker | 346/76 L |
| 3,654,624 | 4/1972 | Becker et al. | 346/76 L |
| 3,665,483 | 5/1972 | Becker et al. | 346/76 L X |
| 4,001,840 | 1/1971 | Becker et al. | 346/76 L |
| 4,038,663 | 7/1977 | Day et al. | 346/76 L |

Primary Examiner—James R. Hoffman
Attorney, Agent, or Firm—Limbach, Limbach & Sutton

[57] ABSTRACT

A flexible laser disc for laser disc mass storage and retrieval of digital data, employs vacuum encapsulation of the laser storage medium in a saturated polyester plastic (PMMA), or other suitable, transparent plastic material, polymethylmethacrylate. The embedded laser storage medium is a low-melting thin film, in which the digital data are stored within laser-focus in the form of diffraction-limited "holes" (bits), created by means of signal-modulated strong laser radiation. The holes (bits) are time-sequentially arranged in the form of spiral or circular tracks of distinct separation. Data are instantaneously and secondarily retrieved with a laser, utilizing phase-lock and servo-controlled tracking with a mirror galvanometer.

2 Claims, 3 Drawing Figures

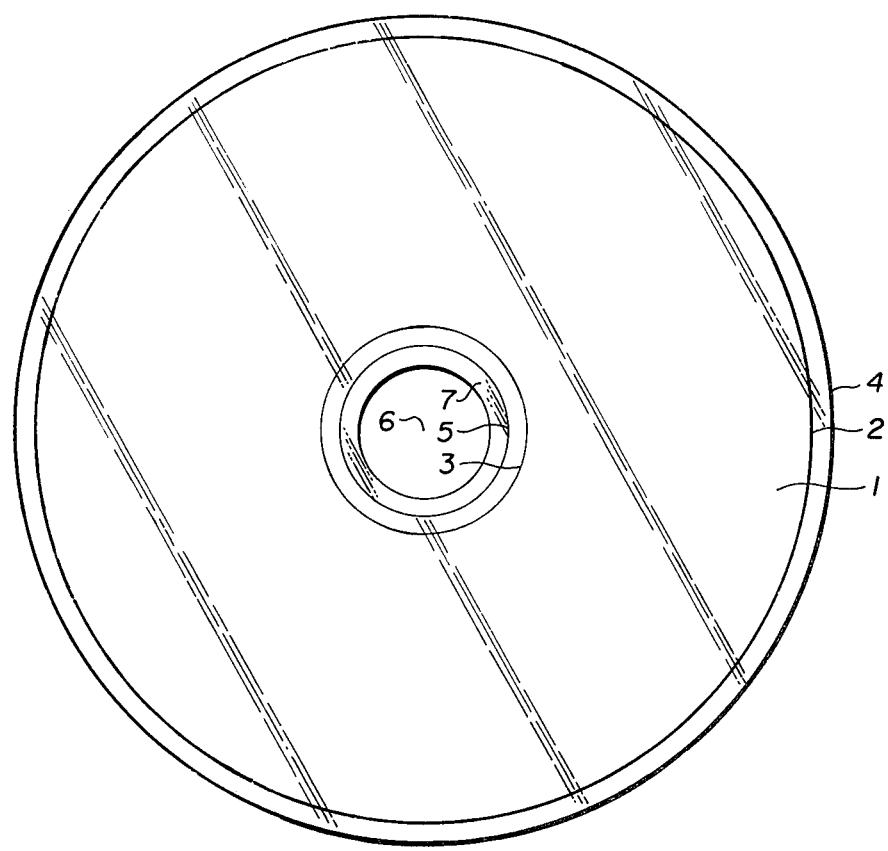
Fig.__1.
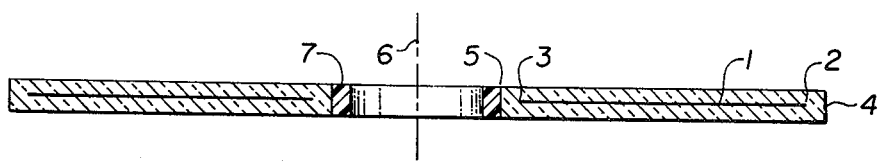
Fig.__2.

METHOD OF MAKING LASER DISC MEMORY STORAGE ARTICLE

This application is a continuation-in-part of my co-pending application Ser. No. 931,515 filed Aug. 7, 1978, and now abandoned.

BACKGROUND OF THE INVENTION

The laser disc of the present invention is the central part of laser disc mass memories, set forth by U.S. Pat. Nos. 3,314,073; 3,474,457; 3,654,624; 3,665,483; and 4,001,840 by Becker, and Becker et al. These patents disclose digital disc storage and retrieval of extreme bandwidths (>50 Mbit/s), linear densities ($2^8=256$), and storage capacities ($10^{10}$ bit/disc), by means of creating diffraction-limited "holes" (bits) within laser-focus in thin metal films. The diameter (d) of these holes (bits) is determined by the Rayleigh-Sommerfield condition of diffraction:

$$d = 1.22 \lambda f/D$$

wherein 1.22 is the first root of a Bessel function, "$\lambda$" is the laser wavelength, "f" is the focal length of the laser focusing objective and "D" is its effective circular aperture diameter (U.S. Pat. No. 3,314,073 by Becker).

The bandwidth of a laser disc storage and retrieval system is determined by the thermodynamics of laser-storage, yielding the characteristic dependence of the bit-creating laser power from the square root of the laser recording frequency (U.S. Pat. No. 3,474,457 by Becker). Minimum laser power is obtained by means of utilizing low-melting thin metal films, like Indium, Tin, etc.

In order to protect the thin metal film against physical damage, dust depositions and deterioration, the film is covered with a transparent layer of a dielectric material (U.S. Pat. No. 3,654,624 by Becker et al). The electronics and kinematics of laser mass storage and retrieval are determined by phase-lock and servo-controls with a mirror galvanometer (U.S. Pat. No. 3,665,483 by Becker et al).

Non-photographic digital laser image recording and reading provides visual, two-dimensional replicas or representations of objects, pictures, illustrations, video-pictures, computer outputs, and the like. It utilizes flat-field optical laser-scanning with laser-beams, focused to a diffraction-limited spot on a radiation sensitive material, e.g., a heat ablatable or vaporizable recording medium, to create in read-time a two-dimensional ensemble of "holes" in the laser-recording medium. The visual laser record is an instantaneous replica of an original image or its computer processed binary equivalent (U.S. Pat. No. 4,001,840 by Becker et al).

In Becker et al U.S. Pat. No. 4,001,840 disclosure is made of a vacuum encapsulation with a space surrounding the metal thin film. In Day et al U.S. Pat. No. 4,038,663 a stream of filtered gas is passed through the space between a covering foil and the writing surface. These structures cannot have an optically perfect interface between the protective coating and the writing surface.

The laser technology thus described will be particularly utilized for the permanent laser storage and retrieval of wideband, digital data, transmitted from satellites. These techniques will be used for satellite exploration of the earth in opto-electronic processes which are designated as "laser remote sensing". The principles of laser remote sensing may be summarized as follows.

After the read-time primary laser disc storage of the raw, digital satellite signals, and after subsequent electronic correction of these data with a large computer, the flexible laser disc stores the computer-output for the "users" and their "remote sensing" operation. They obtain laser-copies of the laser discs by air-mail, as well as photographic copies of the corresponding real images. These are produced in separate, photographic laser recording processes, thus yielding optimum correlation between the digital image data and their equivalent analogous color images.

With the enormous quantities of laser discs required in the future for laser remote sensing with earth satellites, considering $10^{10}$ bit/disc and $10^{12}$ bit/day of satellite data to be stored per ground station, as well as the global distribution of the data for the "users" expected to encompass 400 remote sensing stations all over the world, the laser disc should be utmost reliable, interchangeable, permanent, and of practically unlimited archival life. Laser disc storage should be indefinitely protected against deposition of dust particles, physical damages and deterioration. Based on these considerations, it is the main purpose of this invention to provide means to produce laser discs which comply with the preceding requirements.

In accordance with the present invention a flexible disc for laser disc mass storage and retrieval of data is provided, along with a method of manufacturing the same, wherein a vacuum deposited metal thin-film of low melting point metal is vacuum encapsulated within saturated polyester plastic during processing in a vacuum chamber. There is no space between the metal thin film and the plastic. There is an optically perfect interface between the metal thin film and the plastic.

In one embodiment the metal film is vacuum deposited on a disc layer of saturated polyester plastic, and the metal film is covered with a layer of saturated polyester plastic.

In another embodiment the metal film is coated on the opposed broad surfaces of a glass plate and then a layer of saturated polyester plastic is coated over the metal film on each of the glass plate surfaces.

BRIEF DESCRIPTION OF THE DRAWINGS

FIG. 1 is a schematic top view of a laser disc, constructed in accordance with the present invention;

FIG. 2 is a schematic side view of a laser disc, constructed in accordance with the present invention.

DESCRIPTION OF THE PREFERRED EMBODIMENT

Figure 3:
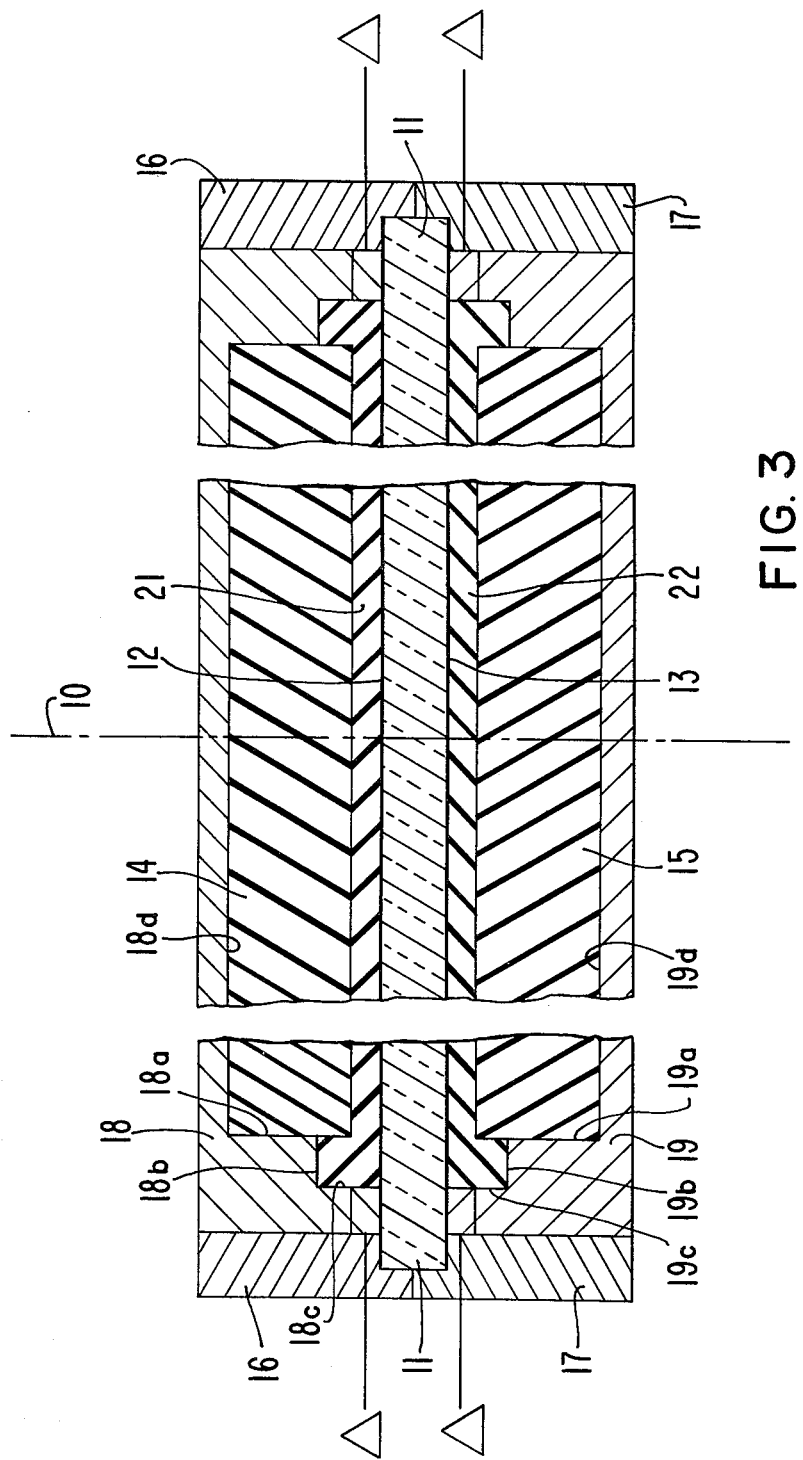
FIG. 3 is a foreshortened, enlarged, schematic, side, sectional view of a laser disc being constructed in accordance with another aspect of the present invention.

Referring to FIGS. 1 and 2, which show the present invention schematically, a laser disc encompasses a suitable, low-melting metallic laser-storage medium 1, in which diffraction-limited "holes" (bits) are created in laser-focus. The holes (bits) are time-sequentially arranged in the form of spiral or circular tracks of distinct separation, which are instantaneously or secondarily retrieved with laser. The thin metal-film has a disc-like shape, the borders 2, 3 of which extend at certain distances between the outside rim 4 of the laser disc and its inner rim 5. The thickness of the thin metal film is of the order of several hundred Angstrom units, depending on the desired optical R T A characteristics of the files, where R T A stands for optical reflectivity (R), transmissivity (T), and absorptivity (A) at the laser wavelength (λ).

The thin metal film is encapsulated within a disc-shaped saturated polyester plastic polymethylmethacrylate (PMMA), or other suitable, transparent plastic material, thus creating a perfect optical interface between the thin metal film and the surrounding plastic material, without gaps, defects, bubbles, etc. The respective distances between the metal film, as well as the top and bottom of the plastic disc, are equal, just like the distances between the outer and inner rims 4, 5 of the laser disc. The total thickness of the laser disc is of the order of a few millimeters, while its diameter is of the order of 36 centimeters.

The techniques of vacuum encapsulation of the thin metal film in a plastic material are well known. For example, pertinent references are: "Acrylics: Now, new property options", Modern Plastics International, April (1978), pp 15–17; Biederick, K., "Kuuststoffe", Vogel Verlag, West Germany (1977): Seymour, W. B. "Modern Plastics Technology", Reston, Prentice Hall, (1975).

Encapsulation of the thin metal film in the plastic material takes place in the vacuum. In principle, the thin metal film is first vacuum-deposited upon a plane primary, transparent plastic disc of half the thickness of the finished disc. Vacuum deposition of the thin metal film occurs by means of RF-sputtering or vacuum evaporation. During the deposition process, the primary disc is rotating at a constant angular velocity around the axis of rotation 6 of the disc, in order to provide an even optical thickness of the thin metal film. The disc-like shape of the thin metal film is provided by physically masking the metal deposition process.

After the thin metal film is built-up to the desired thickness, which is determined by the required R T A parameters, the actual vacuum encapsulation of the thin metal film takes place. From the many techniques available (see references above), the plastic encapsulation process should occur at melting temperature low enough not to damage the surface of the low-melting thin film (Indium, Tin, etc.). After appropriate external shaping of the plastic encapsulation, the resulting final laser disc is removed from the vacuum. Subsequently, the upper surface of the laser disc is optically ground and polished to an appropriate flatness of the order of a λ/4 laser wavelength. In a final operation, disc centering-means 7 of the laser disc is provided. It allows laser disc play-back, for example, at any suitable remote sensing station of the world, utilizing appropriate laser-tracking by means of phase-lock and servo-controls with a mirror-galvanometer.

In accordance with another aspect of the present invention and utilizing modern plastic technology as presented by the references cited hereinabove, one obtains an optically perfect immersion between the thin metal films and solid plastic discs on top and bottom of the laser disc by means of inserting a layer of liquid PMMA between each of the thin metal films and the solid PMMA discs of the laser disc. The resulting laser disc vacuum assembly process is schematically presented in FIG. 3. The vacuum process of laser disc production assures the liquid plastic immersion to be free of bubbles. During the solidification process in the vacuum the state of optical quality is maintained. Based upon these considerations a laser disc is created with an accurate thickness of liquid plastic immersion utilizing the vacuum assembly principles of the laser disc as described below.

The central body of the laser disc is an elastic glass plate 11 of extremely flat optical surface structure, such as on the order of 0.3 mm thick. This glass plate 11 which is first thoroughly washed in water to remove dust particles is brought into a vacuum chamber wherein two thin metal films 12 and 13, such as of Indium, are vacuum deposited on the opposed broad surfaces of the glass plate 11. The thickness of the thin metal films 12 and 13 is typically on the order of 15 nm (150 A°), yielding an approximate triple 33% cross-over point of the metallic reflection (R) transmission (T) and absorption (A) of the film.

Subsequent to metallization, two transparent PMMA plastic plates 14 and 15 are located at each side of the glass plate 11, and by utilizing liquid PMMA layers between the thin metal films 12 and 13 and the plastic plates 14 and 15, respectively, a perfect optical interface is created between each of the transitions of thin metal films 12 and 13 and plastic plates 14 and 15. Covering the metal films 12 and 13 with the PMMA plates 14 and 15 takes place in such a way that the PMMA plates 14 and 15 glide in the vacuum over the metal films through the liquid PMMA layers.

In order to provide exact positioning of the laser disc storage media in respect to flat-field laser-focusing of the system, certain provisions for the laser disc assembly are to be fulfilled during the laser disc manufacturing process. Creation of the laser disc in accordance with this embodiment of the present invention requires two mechanical spacing units 16 and 17 of extremely close dimensional tolerances. The spacing units 16 and 17 are in the form of hollow cylindrical rings provided with shoulders 16a and 17a respectively to engage opposite peripheral corners of the glass plate disc 11.

During the initial state of laser disc production, the glass plate disc 11 is inserted between the spacing units 16 and 17, and this assembly is moved into a vacuum chamber which contains means to rotate the assembly in the vacuum for purposes of vacuum metalization of the two opposed surfaces of the glass plate 11. Rotation of this subassembly around an axis of symmetry 10 will provide uniform metalization of the thin films 12 and 13 on the opposed surfaces of the gas plate and free of "holes", dust particles or thickness variations.

After the metalization process is completed two additional mechanical spacing units 18 and 19 which hold the solid plastic discs 14 and 15 are uplifted within the vacuum chamber and centered within the spacing units 16 and 17 for providing the exact spacing "Δ" for the layer between the plastic discs 14 and 15 and the associated adjacent metal films 15 and 16 respectively. Spacing units 18 and 19 are in the form of cup-shaped members having an ouside diameter selected to slidably fit within the inside diameter of the spacing unit 16 and 17 respectively. The spacing units 18 and 19 include an inner stepped diameter bore of decreasing bore diameter toward the bottom of the cup. The smallest diameter bore portion 18a and 19a is dimensioned to slidably receive the plastic discs 14 and 15. From the bore diameters 18a and 19a the bore expands at a radial surface 18b and 19b to a larger diameter bore 18c and 19c. The distance of the bottom cup surfaces 18d and 19d of spacing units 18 and 19 is precisely selected with respect to the thickness of the plastic discs 14 and 15 to space the surface of the discs 14 and 15 the precise distance "Δ" from the thin films 12 and 13. The plastic discs 14 and 15 when inserted in the units 18 and 19 are coated on their exposed surfaces with a sufficiently thick layer of liquid PMMA to more than completely fill the space between the plastic discs 14 and 15 when the units 18 and 19 are assembled within the spacing units 16 and 17. Thus the assembly of units 18 and 19 and the discs 14 and 15 with their coated surfaces are assembled within the spacing units 16 and 17 and mechanically compressed together. The excess amount of liquid PMMA is caused to flow from between the discs 14 and 15 and the metal films 12 and 13 into reservoirs in the next larger stepped diameter of the spacing units 18 and 19. In order to provide a flawless immersion of the liquid PMMA, the solid PMMA plates are slowly rotated in the vacuum around the axis of rotation 18.

In the final assembly process, the compression of the liquid PMMA layers will be stopped when the ends of the mechanical spacing units 18 and 19 contact the thin metal films assuring the thickness of the liquid PMMA layer to be exactly equal to "Δ".

In order to solidify the PMMA liquid layer between the metal film and the solid PMMA plates 14 and 15 the complete laser disc assembly is hardened within the vacuum within a specified time period. After the liquid layer has hardened as layers 21 and 22 shown in FIG. 3, the total laser disc assembly is taken out of the vacuum chamber and the completed laser disc is removed from the package by removing the spacing units 16, 17, 18, and 19. A final PMMA seal around the periphery around the laser disc can then be provided permanently protecting the rim of the laser disc. It is essential for the appropriate operation of the laser disc that the spacing distances "Δ" are created with an accuracy of the order of λ/4 and remain this way after the laser disc is removed from the vacuum. "λ" is the laser wavelength. The reason for required accuracy follows from the necessity that the variation of laser focused distance during rotation should be at least λ/4.

What is claimed is:

1. The method of making a flexible disc for laser disc mass storage and retrieval of data comprising the steps of establishing a first disc layer of saturated polyester plastic in a vacuum chamber rotating said first disc layer, vacuum depositing a thin metal film on said rotating first disc layer, and covering said thin metal film within the vacuum chamber with saturated polyester plastic thereby vacuum encapsulating the metal thin film and establishing an optically perfect interface between the saturated polyester plastic and thin metal film.

2. The method of making a flexible disc for laser disc mass storage and retrieval of data comprising the steps of establishing a glass disc in a vacuum chamber, vacuum depositing thin metal films on the opposed broad surfaces of said glass disc, positioning a saturated polyester plastic disc against each thin metal film in a vacuum chamber with a layer of liquid saturated polyester plastic of precise thickness there between, hardening the liquid saturated polyester plastic.

* * * * *